United States Patent [19]
Tano et al.

[11] Patent Number: 5,595,836
[45] Date of Patent: Jan. 21, 1997

[54] MANGANESE DRY BATTERY

[75] Inventors: Eiji Tano, Oasaka; Shohei Nozaki, Minoh; Ryohei Ashihara, Neyagawa; Hajime Murakami, Kishiwada; Kohei Kubota, Okegawa; Akira Kato, Tamano; Koichi Sato, Akishima, all of Japan

[73] Assignees: Matsushita Electric Industrial Co., Ltd., Osaka; Mitsui Mining & Smelting Co., Ltd., Tokyo, both of Japan

[21] Appl. No.: 482,701

[22] Filed: Jun. 7, 1995

[30] Foreign Application Priority Data

Jun. 14, 1994 [JP] Japan ..................... 6-131596
Aug. 3, 1994 [JP] Japan ..................... 6-182376

[51] Int. Cl.⁶ ................................... H01M 2/02
[52] U.S. Cl. .................... 429/166; 429/224; 429/229; 429/230; 429/231
[58] Field of Search ........................... 429/224, 229, 429/230, 231, 166

[56] References Cited

U.S. PATENT DOCUMENTS

| | | | |
|---|---|---|---|
| 4,952,368 | 8/1990 | Skenazi et al. | 420/513 |
| 5,079,108 | 1/1992 | Annen | 429/171 |
| 5,281,497 | 1/1994 | Kordesch et al. | 429/224 |
| 5,378,559 | 1/1995 | Randell et al. | 429/206 |

FOREIGN PATENT DOCUMENTS

| | | |
|---|---|---|
| 0608887A2 | 8/1994 | European Pat. Off. . |
| 62-123657 | 6/1987 | Japan . |
| 4-198441 | 7/1992 | Japan . |
| 4-362150 | 12/1992 | Japan . |
| 5-159786 | 6/1993 | Japan . |

OTHER PUBLICATIONS

06–5284, Jan. 14, 1994, Zinc Alkaline Battery; Kiyoto Yoda et al.
01–59768, Mar. 7, 1989, Negative Current Collectors for Zinc–Alkaline Battery; Akira Hayashi.

Primary Examiner—Stephen Kalafut
Assistant Examiner—Richard H. Lilley, Jr.
Attorney, Agent, or Firm—Panitch Schwarze Jacobs & Nadel, P.C.

[57] ABSTRACT

A manganese dry battery includes an anode zinc can made of a zinc alloy containing 0.001–0.5 wt. % of titanium and at least one element selected from the group consisting of 0.001–0.05 wt. % of indium and 0.001–0.05 wt. % of bismuth, or a zinc alloy further containing 0.01–0.4 wt. % of lead. Even without heavy metals such as Hg and Cd, the zinc alloy anode can has a corrosion-resistant property and mechanical strength equivalent to or greater than those of the conventional zinc anode can, thereby giving a low pollution zinc-carbon battery having a storage characteristic equivalent or superior to that of the conventional zinc anode can.

8 Claims, 4 Drawing Sheets

MANGANESE DRY BATTERY

BACKGROUND OF THE INVENTION

1. Field of the Invention

The present invention relates generally to a manganese dry battery which does not contain such heavy metals as mercury and cadmium, and therefore are free from environmental pollution caused by these heavy metals. In particular, the present invention is concerned with an improvement of the composition of alloy for an anode can of such dry battery.

2. Description of the Prior Art

Heretofore, zinc alloys containing 0.03–0.1 wt. % of cadmium and 0.1–0.3 wt. % of lead have generally been employed for configuring a zinc can which also serves as an anode of the manganese dry battery, in order to enhance its workability and mechanical strength which are necessary in the manufacturing process of zinc cans and to suppress possible corrosion of the anode zinc can during storing of the dry battery configured with the anode zinc can.

Environmental pollution due to the heavy metals remaining in waste dry batteries has recently become a serious social concern. At present, the dry batteries are therefore being produced without adding cadmium out of these heavy metals to the zinc alloy for the anode can. However, in view of enhancing the workability and mechanical strength of the anode zinc can and preventing the corrosion of the anode zinc can, which is a cause for the self-discharge of the dry battery configured with the anode zinc can, the content of lead in the zinc alloy is increased to, for instance, 0.3–0.8 wt. % in general.

Lead is however attracting attention in this art as another serious cause for the environmental pollution, similar to mercury and cadmium. Reduction of the amount of lead to be added to the alloy composition, or production of the dry battery without adding any lead is therefore of urgent necessity.

However, as already well known, the proposed reduction or complete exclusion of lead from the zinc alloy, greatly deteriorates the workability and the mechanical strength of the alloy and invites corrosion of the zinc alloy with the decrease in the lead content.

Of these unsolved problems, as a means for solving the corrosion of the zinc alloy, it is already known to use a zinc alloy added with manganese, indium or bismuth as the anode powder for configuring an alkaline-manganese dry battery.

However, when an alloy is produced by adding these metals, the workability of the alloy tends to decrease with the decrease in the added amount of lead, as compared with an anode can made of the prior art zinc alloy added solely with lead.

SUMMARY OF THE INVENTION

The object of the present invention is to provide a manganese dry battery free from mercury or cadmium, in order to solve the above-mentioned problems. The manganese dry battery of the present invention is configured with an anode zinc can which has a workability and a mechanical strength equivalent to or greater than those of the prior art anode zinc can containing 0.3–0.5 wt. % of lead, as well as a battery performance equivalent to or greater than that of the prior art anode can, in view of preventing the corrosion of the zinc alloy.

The present invention provides a manganese dry battery comprising an anode zinc can of a bottomed cylindrical shape, a cathode mixture including an active material of manganese dioxide and contained in the anode zinc can, a cathode collector inserted in the cathode mixture, and a separator interposed between the anode zinc can and the cathode mixture; wherein the anode zinc can is made of a zinc alloy containing 0.01–0.4 wt. % of lead, 0.001–0.5 wt. % of titanium, and at least one member selected from the group consisting of 0.001–0.05 wt. % of indium and 0.001–0.05 wt. % of bismuth.

The present invention also provides a manganese dry battery comprising an anode zinc can of a bottomed cylindrical shape made of a zinc alloy containing 0.01–0.4 wt. % of lead, and 0.001–0.5 wt. % of titanium.

In the above-mentioned manganese dry battery, it is recommendable that the above-mentioned anode zinc can does not contain lead.

Further, it is more preferable that the content of titanium in the above-mentioned anode zinc can is 0.001 wt. % or more and less than 0.01 wt. %.

While the novel features of the present invention are set forth particularly in the appended claims, the invention, both as to organization and content, will be better understood and appreciated, along with other objects and features thereof, from the following detailed description taken in conjunction with the attached drawings.

DESCRIPTION OF THE PREFERRED EMBODIMENTS

Figure 1:
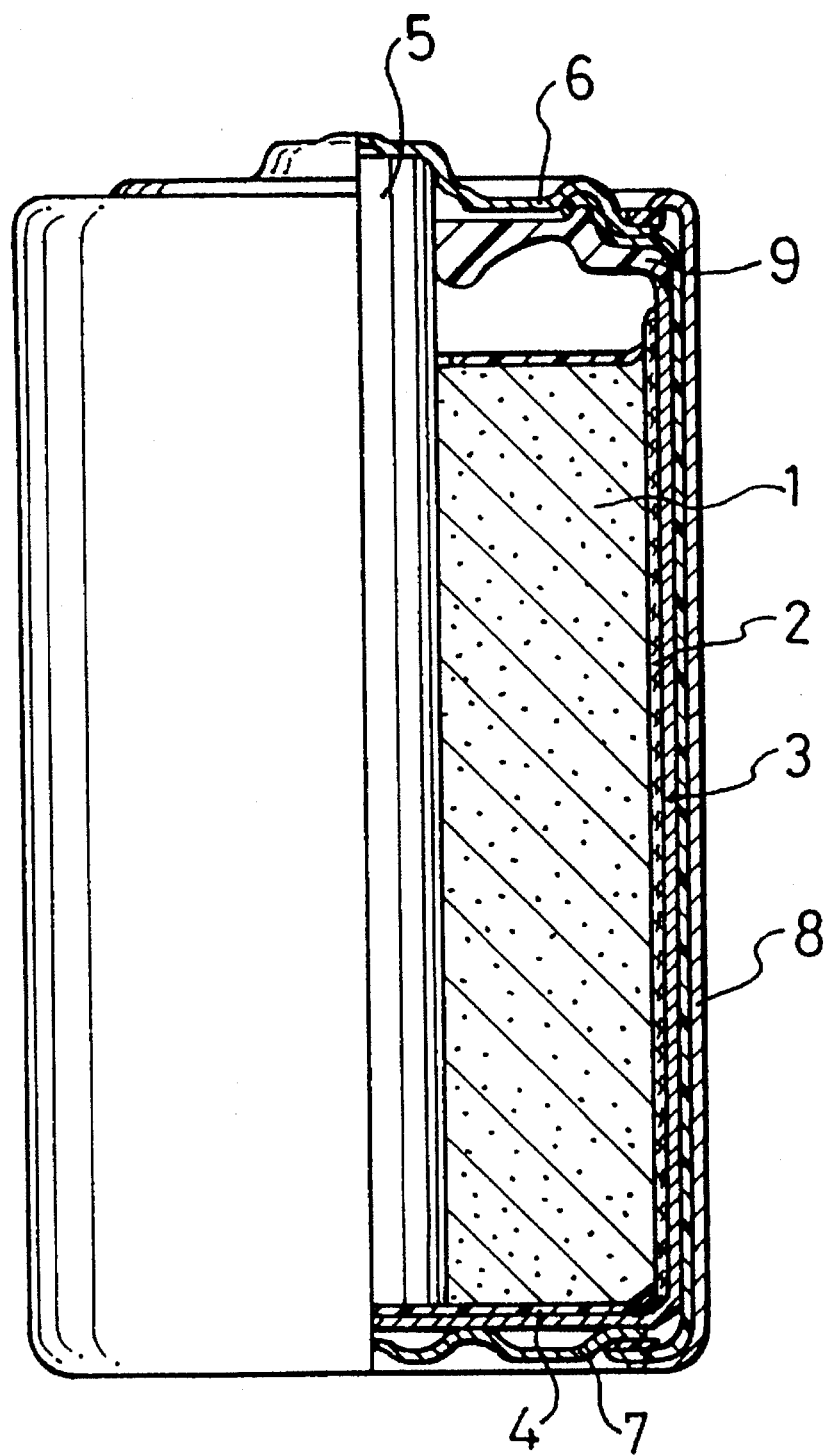
FIG. 1 is a perspective view schematically illustrating a method for measuring the mechanical strength of the anode zinc can employed in configuring the manganese dry battery in accordance with an embodiment of the present invention.

Titanium in the zinc alloy employed for configuring the anode can of the present invention improves the rolling ductility and the mechanical strength of the zinc alloy constituting the anode can mainly with the increase in its added amount. Titanium however deteriorates the corrosion-resistant property of the zinc alloy if its added amount exceeds a certain limit. Furthermore, titanium, if the amount of addition exceeds a certain degree, will cause an abnormal discharge of the dry battery configured with the zinc alloy during an intermittent discharge cycle, which results in a marked shortening of the duration of discharge.

On the other hand, both of indium and bismuth improve the corrosion-resistant property of the zinc alloy but decrease the rolling ductility of the zinc alloy with the increase in the added amounts. If indium is compared with bismuth, indium decreases the rolling ductility of the zinc alloy less than bismuth. Both of indium and bismuth have only a small influence on the mechanical strength of the zinc alloy.

Lead improves the corrosion-resistant property of the zinc alloy with the increase in its added amount, and also improves the mechanical strength of the zinc alloy with the increase in its added amount up to about 1.0 wt. %. Lead has no influence on the rolling ductility of the zinc alloy.

According to the present invention, by employing an anode can made of a zinc alloy wherein indium and/or bismuth and titanium contents are adequately regulated, even if the content of lead in the zinc alloy for the anode can is reduced, it is possible to obtain a workability and a mechanical strength equivalent to or larger than those obtained with an anode can made of the prior art zinc alloy containing 0.3–0.5 wt. % of lead.

Further, by employing such anode can, it is also possible to obtain a preventive effect against the corrosion of the zinc alloy, equivalent to or larger than that of the anode can made of the prior art zinc alloy containing 0.3–0.5 wt. % of lead. Moreover, even with a zinc alloy which does not contain lead, it is possible to obtain a workability and a mechanical strength equivalent to or larger than those obtained with the anode can configured with the prior art zinc alloy containing 0.3–0.5 wt. % of lead. Further, with respect to the prevention of corrosion of the zinc alloy, it is possible to obtain an equivalent effect.

As described previously and apparent from the following disclosure, in accordance with the present invention, it is possible to obtain a useful manganese dry battery, wherein the mechanical strength of the anode can required during the manufacturing process of the battery which is equivalent to or larger than that obtained with the prior art anode can, and the corrosion-resistant or anti-corrosion effect required during storing of the battery is maintained at a level equivalent to or higher than that of the prior art anode can. Thus, the manganese dry battery of the present invention has less risk for environmental pollution.

In the following paragraphs, the present invention will be described in more detail by way of examples with reference to the attached drawings.

EXAMPLE 1

First, each of molten zinc alloys was prepared by melting a zinc ingot having a purity of 99.99% in a low frequency induction furnace at about 500° C. and adding each of the elements in a predetermined amount to have the respective alloy compositions listed in Tables 1–3 below.

In these tables, Sample No. 52 through Sample No. 54 represent Comparative Examples, of which Sample No. 54 represents a zinc alloy for the anode can containing 0.40 wt. % of lead, which has conventionally been used in general.

Subsequently, each of these molten zinc alloys was rolled into a plate of a predetermined thickness while cooling. After being rolled, rolling ductility of each alloy sample was evaluated by observing its surface. Further, each of the rolled plates having the respective composition was punched into a test piece of circular or hexagonal shape. Thereafter, each of these test pieces was molded into a zinc anode can for the manganese dry battery of R20 (D cell) type by means of impact molding process.

In order to evaluate and compare the mechanical strength of the anode zinc cans thus prepared, measurements were performed on the anode cans having the respective zinc alloy compositions as follows.

In the measurement which is schematically illustrated in FIG. 1, an anode zinc can 10 was placed on a V-shaped block 11, and a conical pressure punch 12 was applied with a pressing force in a vertical direction at a spot 10 mm apart from the open end of the anode zinc can 10. Displacement of the zinc can in the predetermined direction and a load at the spot where the conical pressure punch was applied were recorded on a recorder. Based on the fact that the load reached an approximately constant value at about 4 mm of displacement in a usual anode zinc can, a load corresponding to the displacement of 4 mm was defined as the mechanical strength of the anode zinc can for convenience sake.

Next, in order to evaluate the effect of the elements added to the zinc alloy composition for preventing corrosion of the alloy, a test of hydrogen gas generation in an electrolyte was conducted on each of the alloy samples. In the test, each of the test pieces of the anode zinc cans cut to have a predetermined weight was immersed in 5 ml of an electrolyte containing 30 wt. % of zinc chloride and 1.9 wt. % of ammonium chloride at 45° C., and the amount of the generated hydrogen gas was measured after an interval of cumulative 3 days.

The rolling ductilities of the zinc alloys having the respective alloy compositions, mechanical strengths of the respective cans and the amounts of generated hydrogen gas are summarized in Table 1, Table 2 and Table 3 below. In these tables, the rolling ductility is represented by the following symbols:

o: Entirely preferably rolled piece x: Crack development on both side faces of the rolled piece xx: Crack development on the entire surface of the rolled piece, as a result of which the alloy can not be rolled in a predetermined thickness

TABLE 1

| Sample No. | Added elements and their contents in zinc alloy (% by weight) | | | | Rolling ductility of the zinc alloy | Strength of the anode can (kg · f) | Mean gas amount generated during storing at 45° C. (μl/g · day) |
|---|---|---|---|---|---|---|---|
| | Pb | In | Bi | Ti | | | |
| 1 | 0.20 | 0.0005 | 0 | 0.05 | o | 4.1 | 90 |
| 2 | 0.20 | 0.001 | 0 | 0.05 | o | 4.2 | 62 |
| 3 | 0.20 | 0.01 | 0 | 0.05 | o | 4.3 | 47 |
| 4 | 0.20 | 0.05 | 0 | 0.05 | o | 4.3 | 33 |
| 5 | 0.20 | 0.1 | 0 | 0.05 | x | 4.3 | 31 |
| 6 | 0.20 | 0.05 | 0 | 0 | xx | — | — |
| 7 | 0.20 | 0.01 | 0 | 0.0005 | o | 2.8 | 27 |
| 8 | 0.20 | 0.01 | 0 | 0.001 | o | 3.5 | 29 |
| 9 | 0.20 | 0.01 | 0 | 0.01 | o | 4.2 | 32 |
| 10 | 0.20 | 0.01 | 0 | 0.1 | o | 4.5 | 38 |
| 11 | 0.20 | 0.01 | 0 | 0.5 | o | 4.6 | 51 |
| 12 | 0.20 | 0.01 | 0 | 1.0 | o | 4.8 | 93 |
| 13 | 0.40 | 0.01 | 0 | 0.05 | o | 4.5 | 30 |
| 14 | 0 | 0.0005 | 0 | 0.05 | o | 3.8 | 107 |
| 15 | 0 | 0.001 | 0 | 0.05 | o | 3.8 | 68 |
| 16 | 0 | 0.01 | 0 | 0.05 | o | 3.9 | 54 |
| 17 | 0 | 0.05 | 0 | 0.05 | o | 3.9 | 37 |
| 18 | 0 | 0.1 | 0 | 0.05 | x | 3.9 | 36 |

TABLE 2

| Sample No. | Added elements and their contents in zinc alloy (% by weight) | | | | Rolling ductility of the zinc alloy | Strength of the anode can (kg · f) | Mean gas amount generated during storing at 45° C. (μl/g · day) |
|---|---|---|---|---|---|---|---|
| | Pb | In | Bi | Ti | | | |
| 19 | 0 | 0.01 | 0 | 0.0005 | o | 2.7 | 49 |
| 20 | 0 | 0.01 | 0 | 0.001 | o | 3.1 | 50 |
| 21 | 0 | 0.01 | 0 | 0.01 | o | 3.6 | 53 |
| 22 | 0 | 0.01 | 0 | 0.1 | o | 3.8 | 52 |
| 23 | 0 | 0.01 | 0 | 0.5 | o | 4.1 | 63 |
| 24 | 0 | 0.01 | 0 | 1.0 | o | 4.2 | 129 |

TABLE 2-continued

| Sample No. | Added elements and their contents in zinc alloy (% by weight) | | | | Rolling ductility of the zinc alloy | Strength of the anode can (kg·f) | Mean gas amount generated during storing at 45° C. (μl/g·day) |
| --- | --- | --- | --- | --- | --- | --- | --- |
| | Pb | In | Bi | Ti | | | |
| 25 | 0.20 | 0 | 0.0005 | 0.05 | o | 3.9 | 93 |
| 26 | 0.20 | 0 | 0.001 | 0.05 | o | 3.9 | 68 |
| 27 | 0.20 | 0 | 0.01 | 0.05 | o | 3.9 | 39 |
| 28 | 0.20 | 0 | 0.05 | 0.05 | o | 4.0 | 38 |
| 29 | 0.20 | 0 | 0.1 | 0.05 | x | 4.2 | 34 |
| 30 | 0.20 | 0 | 0.05 | 0 | xx | — | — |
| 31 | 0.20 | 0 | 0.01 | 0.0005 | xx | — | — |
| 32 | 0.20 | 0 | 0.01 | 0.001 | o | 3.4 | 39 |
| 33 | 0.20 | 0 | 0.01 | 0.01 | o | 3.9 | 38 |
| 34 | 0.20 | 0 | 0.01 | 0.1 | o | 4.1 | 41 |
| 35 | 0.20 | 0 | 0.01 | 0.5 | o | 4.3 | 58 |
| 36 | 0.20 | 0 | 0.01 | 1.0 | o | 4.5 | 97 |

TABLE 3

| Sample No. | Added elements and their contents in zinc alloy (% by weight) | | | | Rolling ductility of the zinc alloy | Strength of the anode can (kg·f) | Mean gas amount generated during storing at 45° C. (μl/g·day) |
| --- | --- | --- | --- | --- | --- | --- | --- |
| | Pb | In | Bi | Ti | | | |
| 37 | 0.40 | 0 | 0.01 | 0.05 | o | 4.0 | 33 |
| 38 | 0 | 0 | 0.0005 | 0.05 | o | 3.7 | 110 |
| 39 | 0 | 0 | 0.001 | 0.05 | o | 3.7 | 62 |
| 40 | 0 | 0 | 0.01 | 0.05 | o | 3.7 | 55 |
| 41 | 0 | 0 | 0.05 | 0.05 | o | 3.8 | 53 |
| 42 | 0 | 0 | 0.1 | 0.05 | x | 4.0 | 46 |
| 43 | 0 | 0 | 0.01 | 0.0005 | x | 2.1 | 58 |
| 44 | 0 | 0 | 0.01 | 0.001 | o | 3.1 | 61 |
| 45 | 0 | 0 | 0.01 | 0.01 | o | 3.6 | 65 |
| 46 | 0 | 0 | 0.01 | 0.1 | o | 3.9 | 64 |
| 47 | 0 | 0 | 0.01 | 0.5 | o | 4.0 | 70 |
| 48 | 0 | 0 | 0.01 | 1.0 | o | 4.3 | 134 |
| 49 | 0.40 | 0.05 | 0.05 | 0.05 | o | 4.3 | 28 |
| 50 | 0.20 | 0.05 | 0.05 | 0.05 | o | 4.1 | 30 |
| 51 | 0 | 0.05 | 0.05 | 0.05 | o | 3.8 | 38 |
| 52 | 0 | 0 | 0 | 0 | o | 1.1 | 101 |
| 53 | 0.20 | 0 | 0 | 0 | o | 2.0 | 82 |
| 54 | 0.40 | 0 | 0 | 0 | o | 2.5 | 67 |

As clearly seen in the above-mentioned tables, it is appreciated that the mechanical strength of the anode zinc can is improved by adding titanium to the zinc alloy containing indium alone, or indium and lead, based on the results obtained with Sample No. 7 through Sample No. 12, and Sample No. 19 through Sample No. 24. It is also appreciated that the mechanical strength of the anode zinc can is improved by adding titanium to the zinc alloy containing bismuth alone, or bismuth and lead, based on the results obtained with Sample No. 31 through Sample No. 36, and Sample No. 43 through Sample No. 48.

It is further appreciated that a suppressive effect on the generation of hydrogen gas is yielded by adding indium to the zinc alloy containing titanium, based on the results obtained with Sample No. 1 through Sample No. 5, and Sample No. 14 through Sample No. 18. Similarly, it is appreciated that a suppressive effect on the generation of hydrogen gas is yielded by adding indium to the zinc alloy containing bismuth.

Although the rolling ductility of the zinc alloy is improved by addition of titanium, improvement in the rolling ductility due to the addition of titanium is decreased if the amount of added indium or bismuth is 0.1 wt. % or more.

In order to maintain a preferable rolling ductility and satisfy both the mechanical strength of the anode zinc can and the gas generation suppressing effect equivalent to those of the prior art alloy of Sample No. 54 (comparative example) containing 0.4 wt. % of lead, the elements contained in the zinc alloy are preferably in a range of 0.001–0.05 wt. % for indium or bismuth, and in a range of 0.001–0.5 wt. % for titanium, respectively.

Outside the above-mentioned ranges, the workability of the zinc alloy will be worsened as compared with that of Sample No. 54. If the added amount is smaller than the range, the zinc alloy is soft, but if larger than the range, the mechanical strength of the zinc alloy becomes poor so that it becomes brittle and develops cracks during the rolling process. Moreover, there arises another problem that a practical discharge performance of the dry battery configured with the anode zinc can cannot be maintained properly during storing because of generation of hydrogen gas.

When an alloy composition containing lead is compared with another alloy composition which does not contain lead, the latter alloy has a slightly inferior suppressive effect on the hydrogen gas generation to the former alloy, but the suppressive effect is still equivalent to or slightly larger than that of Sample No. 54 (comparative example), and the mechanical strength of the latter alloy is larger than that of Sample No. 54.

Further, as clearly shown by Sample No. 49 through Sample No. 51, if indium coexists with bismuth, the suppressive effect on the hydrogen gas generation increases as compared with the alloys which contain either one of them. When indium and bismuth are added by 0.05 wt. %, respectively, the rolling ductility of the obtained alloy becomes preferable. Further, it is appreciated that titanium is highly effective for suppressing the hydrogen gas generation and improving the mechanical strength when the amount of addition is in a range of 0.01–0.1 wt. %.

Based on these results, it is concluded that the contents of the respective elements in the alloy composition should be in the above-mentioned ranges; and if the contents are within the above-mentioned ranges, the workability and the mechanical strength of the zinc alloy can be maintained at the levels equivalent to or higher than those of the prior art anode zinc can containing 0.3–0.5 wt. % of lead. Further, from the point of view of the corrosion, the anode zinc can containing the respective elements in the above-stated ranges has a corrosion-preventive effect equivalent to or larger than that of the prior art anode zinc can.

Next, an illustration will be made on a preferable range of titanium content in more detail.

That is, if titanium is added to the zinc alloy by 0.01 wt. % or more, an abnormal discharge occurs in the dry battery configured with the zinc alloy during a light load intermittent discharge cycle.

Figure 2:
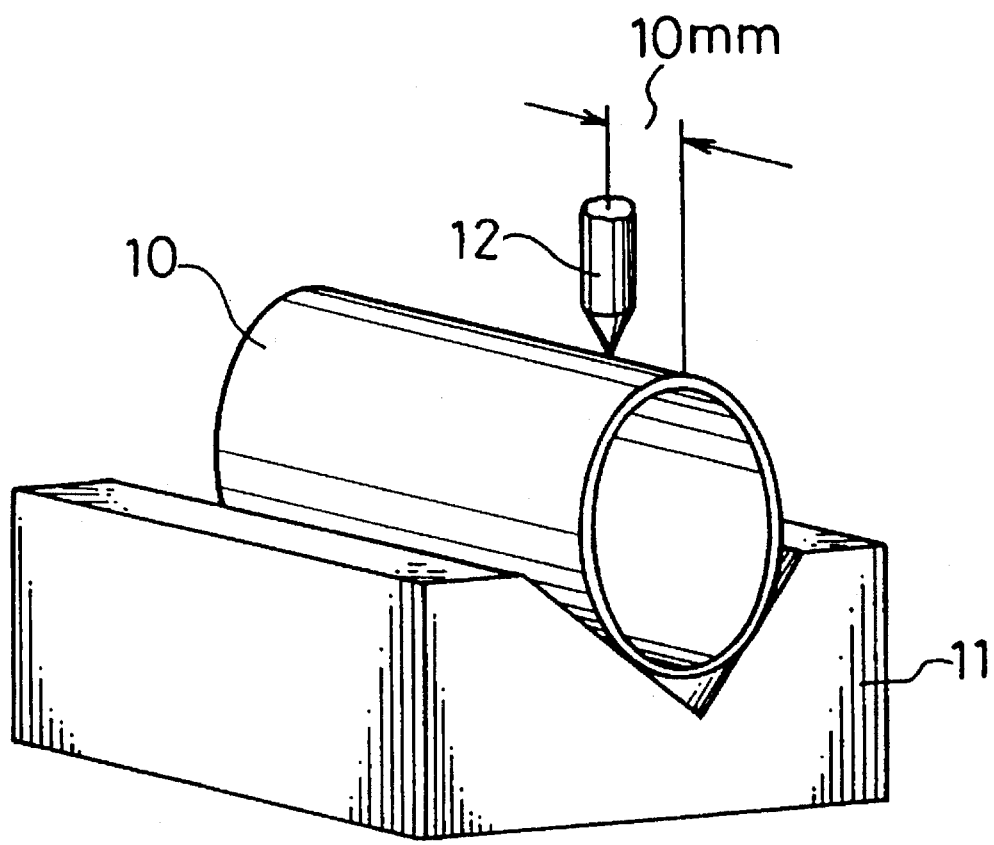
FIG. 2 is a longitudinal cross-sectional view showing an example of a cylindrical manganese dry battery built in accordance with the present invention.

First, manganese dry batteries of the zinc chloride type of R20 size shown in FIG. 2 were produced by employing each of the anode zinc cans of the Samples listed in Table 4 below. Referring to FIG. 2, an anode zinc can 3 of a bottomed cylindrical shape contains therein a cathode mixture 1 with an active material of manganese dioxide, a carbon rod 5 constituting a cathode collector, a separator 2 having a paste layer over its one face and a bottom insulator paper 4. The upper opening of the zinc can is sealed with a sealing member 9 of polyethylene. A sealing plate 6 integrally formed with a cathode cap is fitted on the top of the carbon rod. The above-mentioned assembly is housed in an outer jacket 8 combined with a bottom plate 7 which serves as an anode terminal.

In the following paragraphs, a description will be made on the intermittent discharge tests conducted on the produced dry batteries and the results are shown by a diagram in FIG. 3. The discharge tests were performed in compliance with a method specified by the IEC standard; the discharge cycle of the dry battery is performed with a load of 39 Ω in such a mode that the battery is discharged for 4 hours, followed by a rest for 20 hours per day.

Figure 3:
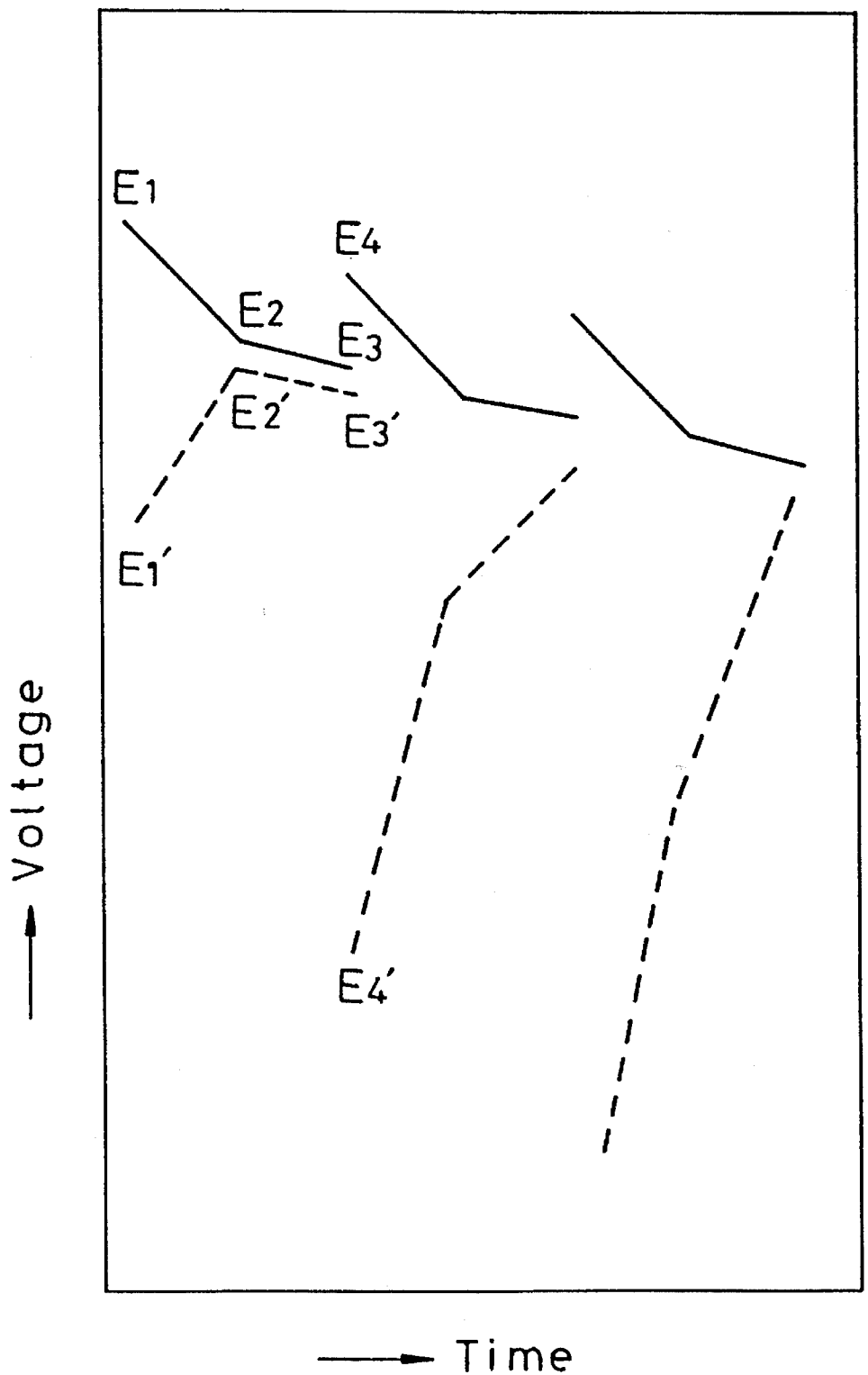
FIG. 3 is a diagram showing exemplified intermittent discharge curves of the manganese dry batteries, illustrating an abnormal discharge.

The solid lines of the diagram in FIG. 3 represent typical intermittent discharge curves of the normal manganese dry battery. The voltages of this dry battery, which are measured immediately and 2 hours after initiation of the first discharging step, and just before the end of the first discharging step, are represented by $E_1$, $E_2$ and $E_3$, respectively. The voltage immediately after initiation of the subsequent discharging step after a rest for 20 hours is represented by $E_4$.

As shown by the solid lines of the diagram in FIG. 3, the voltage normally decreases with the progress of the discharging step as indicated by $E_1$, $E_2$ and $E_3$. However, the voltage $E_4$ after a rest recovers to a higher value than the voltage $E_3$ just after the end of the first discharge step.

If the titanium content in the anode zinc can is 0.01 wt. % or more as in Sample Nos. 21, 63 and 67, the voltage after a rest decreases to a lower value as represented by $E_4'$ on the broken lines of the diagram in FIG. 3 than the value represented by $E_3'$ at the end of the previous discharging step.

It is believed that the cause of the abnormal discharge such as no recovery or further decrease of the voltage after a rest is possible formation of a substance on the surface of the zinc can which hinders conduction.

If the decrease in the voltage $E_4'$ is great, the duration of discharge is remarkably shortened as in Sample No. 63.

Figure 4:
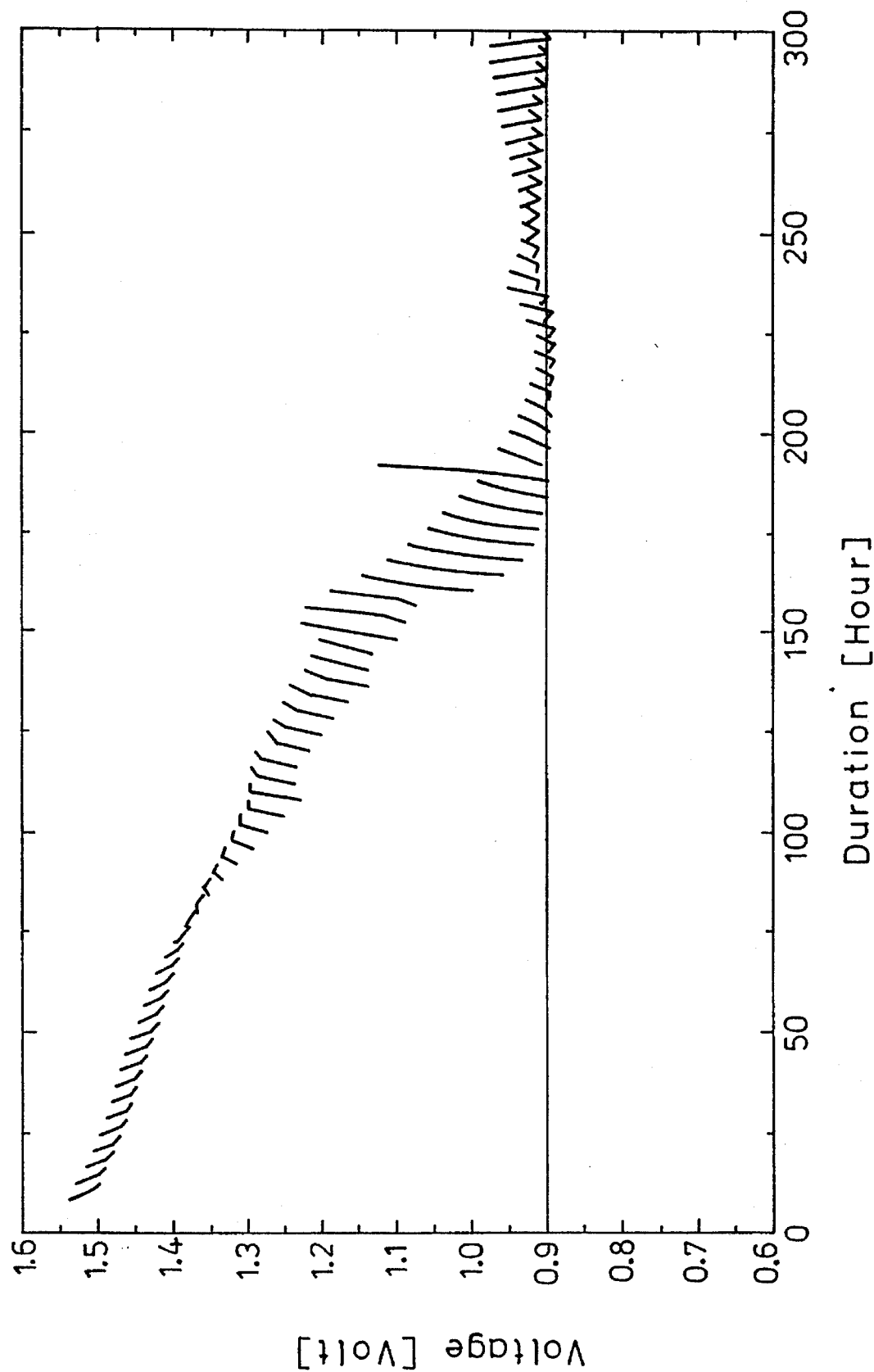
FIG. 4 is a diagram showing a typical intermittent discharge curve of a dry battery which demonstrates the abnormal discharge.

An example of such abnormal discharge is illustrated by a diagram in FIG. 4.

This phenomenon of abnormal discharge occurs in the battery samples which use a zinc anode can containing a larger titanium content. Namely, as indicated by Sample Nos. 19, 20, 55–62, and 64–66 in Table 4, no abnormal discharge occurs by a titanium content of smaller than 0.01 wt. %. As indicated by Sample Nos. 21, 63 and 67 in Table 4, the abnormal discharge occurs for a titanium content of 0.01 wt. % or larger.

TABLE 4

| Sample No. | Added elements and their contents in zinc alloy (% by weight) | | | Duration of intermittent discharge with 39Ω load (hrs) | Occurrence of abnormal discharge |
| --- | --- | --- | --- | --- | --- |
| | In | Bi | Ti | | |
| 19 | 0.01 | 0 | 0.0005 | 290 | No |
| 20 | 0.01 | 0 | 0.001 | 292 | No |
| 55 | 0.01 | 0 | 0.002 | 287 | No |
| 56 | 0.01 | 0 | 0.003 | 291 | No |
| 57 | 0.01 | 0 | 0.004 | 289 | No |
| 58 | 0.01 | 0 | 0.005 | 290 | No |
| 59 | 0.01 | 0 | 0.006 | 288 | No |
| 60 | 0.01 | 0 | 0.007 | 292 | No |
| 61 | 0.01 | 0 | 0.008 | 289 | No |
| 62 | 0.01 | 0 | 0.009 | 288 | No |
| 21 | 0.01 | 0 | 0.01 | 254 | Yes |
| 63 | 0.01 | 0.01 | 0.05 | 157 | Yes |
| 64 | 0 | 0.01 | 0.001 | 290 | No |
| 65 | 0 | 0.01 | 0.005 | 289 | No |
| 66 | 0 | 0.01 | 0.009 | 293 | No |
| 67 | 0 | 0.01 | 0.01 | 238 | Yes |

In the above-mentioned example, although the description is limited to the alloys of the Zn—Ti—In system and the Zn—Ti—Bi system, a behavior similar to the above-mentioned mode occurs not only in the alloys of the Zn—Ti—In—Bi system but also in the lead containing alloys of the above-mentioned three systems.

The lowest limit of lead content of 0.01 wt. % in the above description represents the content of lead unavoidably contained in the zinc metal (purity: 99.99 wt. %), which is generally used as the raw material for the anode zinc can of the manganese dry battery.

EXAMPLE 2

By melting zinc metal having a purity of 99.99% and adding specified amounts of lead and/or titanium to the molten zinc, the zinc alloy samples listed in Table 5 below were prepared. In Tables 5 and 6, Sample No. 115 through Sample No. 117 represent Comparative Examples.

By employing each of the above-mentioned zinc alloys, an anode zinc can for R20 type dry battery was prepared, and the cans were used for the evaluation of their mechanical strength. The method employed for the evaluation was the same as that in Example 1.

Next, in order to evaluate the corrosion-resistant property of the anode zinc can, a test of hydrogen gas generation in an electrolyte was conducted on each of the alloy samples. The method employed for the test was similar to that in Example 1, and each of the test pieces of the anode zinc cans cut to have a predetermined weight of this example was immersed in the electrolyte, left alone in an atmosphere at 45° C. The amount of generated hydrogen gas was measured after an interval of cumulative 3 days.

Further, by employing each of the above-mentioned anode zinc, manganese dry batteries of the zinc chloride type of R20 size shown in FIG. 2 were prepared in a manner similar to that in Example 1. And, in order to evaluate the storage characteristic of these manganese dry batteries, continuous discharge tests were conducted on the dry batteries immediately after production and after storing at 45° C. for 3 months. The continuous discharge tests were performed in such a mode that a load of 2 Ω was connected across both terminals of the dry battery and the duration of the discharge was measured up to the time point when the terminal voltage reaches 0.9 V.

The results of the above-mentioned measurements are summarized in Tables 5 and 6 below.

TABLE 5

| Sample No. | Added elements and their contents in zinc alloy (% by weight) | | | Strength of the zinc can (kg · f) |
| --- | --- | --- | --- | --- |
| | Pb | Cd | Ti | |
| 101 | 0 | 0 | 0.0005 | 1.39 |
| 102 | 0 | 0 | 0.001 | 2.60 |
| 103 | 0 | 0 | 0.01 | 3.07 |
| 104 | 0 | 0 | 0.1 | 3.26 |
| 105 | 0 | 0 | 0.5 | 3.28 |
| 106 | 0 | 0 | 1.0 | 3.30 |
| 107 | 0.30 | 0 | 0.001 | 3.14 |
| 108 | 0.30 | 0 | 0.01 | 3.65 |
| 109 | 0.30 | 0 | 0.1 | 3.70 |
| 110 | 0.30 | 0 | 0.5 | 3.72 |
| 111 | 0.50 | 0 | 0.001 | 3.33 |
| 112 | 0.50 | 0 | 0.01 | 4.04 |
| 113 | 0.50 | 0 | 0.1 | 4.10 |
| 114 | 0.50 | 0 | 0.5 | 4.12 |
| 115 | 0.20 | 0.05 | 0 | 2.78 |
| 116 | 0.40 | 0 | 0 | 2.50 |
| 117 | 0 | 0 | 0 | 1.09 |

TABLE 6

| Sample No. | Amount of generated gas (μl/g) | Duration of discharge (min) | |
|---|---|---|---|
| | | Immediately after production | After storing at 45° C. for 3 months |
| 101 | 237 | 471 | 301 |
| 102 | 216 | 477 | 324 |
| 103 | 180 | 481 | 346 |
| 104 | 190 | 480 | 353 |
| 105 | 199 | 477 | 336 |
| 106 | 230 | 478 | 304 |
| 107 | 184 | 476 | 351 |
| 108 | 176 | 479 | 360 |
| 109 | 172 | 478 | 359 |
| 110 | 187 | 477 | 348 |
| 111 | 181 | 478 | 355 |
| 112 | 177 | 480 | 358 |
| 113 | 172 | 481 | 361 |
| 114 | 195 | 480 | 350 |
| 115 | 190 | 476 | 357 |
| 116 | 182 | 478 | 361 |
| 117 | 241 | 470 | 292 |

Based on the results of Sample Nos. 102–105 in the above tables, by adding titanium to zinc alloy by 0.001–0.5 wt. %, the mechanical strength of the anode zinc can is improved more than that of the prior art zinc can of Sample No. 116 containing lead only. Further, an addition of titanium by 0.01 wt. % or more can give the anode zinc can a larger mechanical strength than that of Sample No. 115 which contains cadmium. In Sample No. 101, which contains titanium of less than 0.001 wt. %, the anode zinc can becomes soft and a sufficient mechanical strength can not be obtained. Further, in a range where the added amount of titanium exceeds 0.5 wt. % as in Sample No. 106, the corrosion-resistant property of the zinc alloy is deteriorated.

With the titanium-zinc alloys free from lead, the corrosion-resistant property of the anode zinc can and the storage characteristic of the dry battery configured with the anode zinc can are approximately equivalent to those of the prior art anode zinc can, for a titanium content range of 0.01–0.5 wt. %.

Further, in the zinc alloy containing lead, the mechanical strength of the anode zinc can is improved by the addition of titanium, as indicated by Sample Nos. 107–114. For a titanium content range of 0.01–0.1 wt. %, the mechanical strength and the corrosion-resistant property of the anode zinc can as well as the storage characteristic of the dry battery configured with the anode zinc can are most excellent.

Although the content of 0.3 wt. % or 0.5 wt. % was employed as the lead content in the previously-described example, a result approximately similar to that as mentioned above is obtained for a lead content range of 0.5 wt. % or less.

As clearly shown by this example, by adding titanium to the zinc alloy composition for configuring the anode zinc can of the present invention, it is possible to obtain an alloy having the workability and the mechanical strength equivalent to those of the prior art alloy containing lead and cadmium. It is believed that the crystal structure of the added alloy is made finer by the addition of titanium.

In the zinc alloy containing lead by 0.5 wt. % or less, the zinc alloy can have a mechanical strength equivalent to or larger than that of the conventional alloy containing lead and cadmium and the dry battery configured with the zinc alloy can have a storage characteristic equivalent to or larger than that of the conventional dry battery, when the titanium content is in the range of 0.001 wt. % to 0.5 wt. %. In the lead-free zinc alloys, similar effects can be obtained if the titanium content is in the range of 0.01–0.5 wt. %.

Although the present invention has been described in terms of the presently preferred embodiments, it is to be understood that such disclosures are not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A manganese dry battery comprising an anode zinc can of a bottomed cylindrical shape, a cathode mixture including an active material of manganese dioxide and contained in said anode zinc can, a cathode collector inserted in said cathode mixture, and a separator interposed between said anode zinc can and said cathode mixture; wherein said anode zinc can is made of a zinc alloy containing 0.01–0.4 wt. % of lead, 0.001–0.5 wt. % of titanium, and at least one member selected from the group consisting of 0.001–0.05 wt. % of indium and 0.001–0.05 wt. % of bismuth.

2. A manganese dry battery comprising an anode zinc can of a bottomed cylindrical shape, a cathode mixture including an active material of manganese dioxide and contained in said anode zinc can, a cathode collector inserted in said cathode mixture, and a separator interposed between said anode zinc can and said cathode mixture; wherein said anode zinc can is made of a zinc alloy containing 0.001–0.5 wt. % of titanium, and at least one member selected from the group consisting of 0.001–0.05 wt. % of indium and 0.001–0.05 wt. % of bismuth.

3. A manganese dry battery comprising an anode zinc can of a bottomed cylindrical shape, a cathode mixture including an active material of manganese dioxide and contained in said anode zinc can, a cathode collector inserted in said cathode mixture, and a separator interposed between said anode zinc can and said cathode mixture; wherein said anode zinc can is made of a zinc alloy containing 0.01–0.4 wt. % of lead and 0.001–0.5 wt. % of titanium.

4. A manganese dry battery comprising an anode zinc can of a bottomed cylindrical shape, a cathode mixture including an active material of manganese dioxide and contained in said anode zinc can, a cathode collector inserted in said cathode mixture, and a separator interposed between said anode zinc can and said cathode mixture; wherein said anode zinc can is made of a zinc alloy containing 0.001–0.5 wt. % of titanium.

5. The manganese dry battery in accordance with claim 1, wherein the content of titanium is 0.001 wt. % or larger and smaller than 0.01 wt. %.

6. The manganese dry battery in accordance with claim 2, wherein the content of titanium is 0.001 wt. % or larger and smaller than 0.01 wt. %.

7. The manganese dry battery in accordance with claim 3, wherein the content of titanium is 0.001 wt. % or larger and smaller than 0.01 wt. %.

8. The manganese dry battery in accordance with claim 4, wherein the content of titanium is 0.001 wt. % or larger and smaller than 0.01 wt. %.

* * * * *